United States Patent [19]
Rowe et al.

[11] Patent Number: 5,623,613
[45] Date of Patent: Apr. 22, 1997

[54] SYSTEM FOR DISPLAYING PROGRAMMING INFORMATION

[75] Inventors: Keith Rowe; Frank Lawler, both of Seattle; Joseph H. Matthews, III, Redmond, all of Wash.

[73] Assignee: Microsoft Corporation, Redmond, Wash.

[21] Appl. No.: 346,422

[22] Filed: Nov. 29, 1994

[51] Int. Cl.⁶ .................................................. G06F 15/00
[52] U.S. Cl. ........................... 395/353; 395/341; 395/357; 395/973
[58] Field of Search ..................................... 395/155, 156, 395/157, 159, 160, 161

[56] References Cited

FOREIGN PATENT DOCUMENTS

WO92/04801  9/1991  WIPO .

*Primary Examiner*—Mark R. Powell
*Assistant Examiner*—Huynh Ba
*Attorney, Agent, or Firm*—Jones & Askew

[57] ABSTRACT

A system for retrieving and displaying programming information in response to selection of a category of programming information. Programming information is presented via a schedule display having a category display, a subcategory category display, and a program display. The category display displays an array of category tiles representing categories of programming information. The subcategory display displays an array of subcategory tiles representing subcategories that are associated with the categories of the category display. The program display displays an array of program tiles that are associated with the subcategories of the subcategory display. A viewing panel extends along each of the displays for displaying one each of the category, subcategory, and program tiles. Classes of programming information are selected by scrolling the tiles of the associated displays until the desired class items are presented within the viewing panel.

30 Claims, 6 Drawing Sheets

SYSTEM FOR DISPLAYING PROGRAMMING INFORMATION

TECHNICAL FIELD

The invention relates generally to schedules for programming information and, more specifically, to a system for retrieving and displaying programming information in response to selection of a category of programming information.

BACKGROUND OF THE INVENTION

A national information infrastructure constructed from both wireless and wired communications networks supports the communication of information in homes and businesses throughout the country. Telephones, televisions, radios, computers, and facsimile machines are used each day to receive, store, process, perform, display, and transmit data, text, voice, sound, and graphic images. These devices are typically connected via fiber optic cables, coaxial cables, electronic switches and routers, microwave networks, satellites, and other communications technologies. This national information infrastructure, which may one day be expanded to a global infrastructure, supports the electronic transfer of a wide variety of programming to entertain, instruct, or inform receiving parties. In view of both the variety and the substantial amount of available programming, a user typically uses a programming schedule or guide to select a desired program for reception (or transmission) on a certain date and time.

For example, a subscriber to cable network programming services, such as premium cable television or audio services, typically uses a printed schedule to select a program for viewing or listening to at a certain time period. In addition, certain cable television services supply the viewer with an on-screen programming schedule from the headend processor via the able distribution network. For both printed and on-screen programming schedules, the programming information is typically presented as a function of the date and time for the scheduled programs. Thus, if the subscriber is interested in viewing a sports-related program, it is necessary for the subscriber to review the time periods for that date to determine if a sports-related program is scheduled during the viewing period. This time-based presentation of programming schedule information is satisfactory only when the amount of available programming is relatively limited. Furthermore, unlike the printed programming schedule, the user typically cannot control the order of the programming information supplied by an on-screen programming schedule because this information is supplied from a remote location via a conventional one-way cable distribution network.

In view of the advances in computing and broadband communications systems, it is expected that the present information infrastructure will evolve into an integrated communications network supported by advanced high-speed, interactive, broadband, digital communications equipment. Telephones, televisions, radios, computers, and facsimile machines will be linked by this interactive broadband information intrastructure and will be able to communicate and interact with other communication devices in a digital signal format. This interactive broadband information infrastructure, commonly referred to as the "information superhighway," has great potential to increase access to information and entertainment resources that can be delivered quickly and economically anywhere in the country. For example, it is feasible that hundreds of channels of "television" programming, thousands of audio recordings, and literally millions of "magazines" and "books" can be made available to homes and businesses via this information superhighway. In view of this tremendous expansion of available programming, the use of a programming schedule or guide will be critical for a user to select a desired program. However, as choices of programming increase, the prior time-based format of programming schedules becomes a less manageable technique for choosing a desired program because of the numerous programs available for any one time period. Thus, there is a need for a category-based programming schedule to clarify and to simplify for an audience the process of selecting programs of interest to each audience member.

The present invention supplies a system of retrieving and displaying a schedule for programming based primarily upon the classes of programs, rather than the time period for each program. The programming information displayed by this system is restricted to those programs matching characteristics selected by the viewer. This permits the viewer to narrow the scope of programming information supplied by the system to a more manageable number of choices and enables the viewer to have personal control over the displayed programming information. The present invention also provides a highly intuitive user interface to support the easy and convenient selection of desired programming information.

SUMMARY OF THE INVENTION

The present invention fulfills the above-described needs by providing a system for presenting programming information in an efficient and user-friendly manner based upon the classes of scheduled programs. This allows a user to view programming information by genre groupings rather than by a time-based schedule, thereby affording the user the opportunity to obtain information about a desired program from a substantial listing of available programs. The programming schedule can be presented as a display on a display device, such as a television or a computer monitor. The user can control the displayed programming information by selecting the category for the desired program, thereby updating the displayed programming information to match the viewer's selection. The selection of programming information can be controlled remotely via a remote control unit or directly by another input device, such as a keypad or a touch-sensitive screen.

Generally described, the system for retrieving and displaying programming information, i.e., the programming guide system, presents scheduling information for programs via a schedule display having three display elements, a category display, a subcategory display, and a program display. The category display displays an array of category tiles representing categories of programming information. The subcategory display displays an array of subcategory tiles representing subcategories that are associated with the categories of the category display. The program display displays an array of program tiles representing programs that are associated with the subcategories of the subcategory display.

To allow the user to easily view the tiles of each of the displays, the displays can be located adjacent to each other. A viewing panel can extend along a portion of each of the displays for displaying one each of the category, subcategory, and program tiles. In this manner, the viewer is presented with selected programming information divided into three separate classes, namely broad, mid, and narrow-scope classes of programming information.

A category of programming information can be selected by moving a corresponding category tile within the viewing panel. In response, the subcategory display displays a subcategory tile representing the subcategory associated with the selected category. This narrows the scope of displayed programming information by supplying subcategory information that is relevant to the selected category.

Likewise a subcategory of programming information can be selected by moving the corresponding subcategory tile within the viewing panel. In response, the program display displays one or more program tiles representing programs associated with the selected subcategory. This further narrows the scope of displayed scheduling information to the level of individual programs. The program tiles representing these programs can be ordered chronologically to supply the viewer with a time-based view of programs associated with the selected subcategory and the selected category.

The programming information is stored within one or more databases and is retrievable to support the display of selected programming information by the display system. Specifically, the category tiles, subcategory tiles, and program tiles are stored within a database structure on a memory storage device and can be retrieved as required to support the display of programming information represented by these tiles. Thus, at least one of the subcategory tiles representing a subcategory associated with a selected category is retrieved from the database in response to a selected category tile appearing within the viewing panel. In response to a selected subcategory tile appearing within the viewing panel, at least one program tile representing a program associated with the selected subcategory is retrieved from the database if a program is available that is associated with the selected subcategory.

More particularly described, the user can peruse a selected class of programming information by scrolling the tiles of one of the category, subcategory, or program displays. To control the display of one of the category, subcategory, or program tiles, the user can move a focus frame along the viewing panel to a location proximate to the selected corresponding display. The focus frame operates to highlight information supplied by the tile selected by the user by "framing" the tile, and supplies a visual cue to the user that the display associated with the framed tile can be controlled. For example, to control the category display, the user moves the focus frame along the viewing panel to a position on the category display. Upon positioning the focus frame over the category display, the category tile appearing within the viewing panel also appears within the focus frame. Thus, the focus frame extends along the boundary of the selected category tile. For this position of the focus frame, the viewer can scroll in a selected direction the category tiles, thereby supporting the selection of another category tile for viewing within the viewing panel (and the focus frame). Similar to the representative example of the category display, each of the subcategory and program displays can be controlled by placing the focus frame proximate to the respective display and thereafter scrolling through the tiles representing the selected programming information.

A remote control unit, such as an infrared transmitting device, can be used to transmit commands for controlling the programming information displayed by the category, subcategory, and program displays. Specifically, the position of the focus frame can be changed or the tiles of a selected display can be scrolled by outputting appropriate directional instructions via the remote control unit, thereby allowing the viewer to navigate the sources of programming information. However, other types of input devices also can be used to control the category, subcategory, and program displays, including a direct-wired keypad or a touch-sensitive screen.

Each of the program tiles can include text-based and/or graphical information regarding the represented program, including name, program date and start-time, and program channel. In addition, a program tile can list the network responsible for supplying the program, including the logo or symbol for the responsible network. Another option for program tiles is the use of graphic images, such as information icons, to represent secondary program information, including the items of closed captioning, audience rating, awards, star rating, or rerun status. The use of information icons on a program tile reduces the amount of text displayed on the screen, which, in turn, makes it easier to locate and read program titles or names.

For another aspect of the present invention, the program display can include date tiles representing calendar dates to separate the time-sorted program tiles, thereby eliminating any requirement of supplying date-related information for each program tile. Each date tile can separate program tiles associated with one date from program tiles associated with another date. In this manner, the program tiles in the corresponding programs are grouped by both date and time. The program display also can include a date status indicator that displays the date associated with the presently displayed program tiles.

Accordingly, it is an object of the present invention to provide a system for retrieving and displaying programming information based upon the categories of the programming information.

It is a further object of the present invention to provide a system for retrieving and displaying a schedule for programming in response to program characteristics selected by the user.

It is a further object of the present invention to provide a system for retrieving and displaying programming information that allows the user to narrow the scope of displayed programming information to a more manageable number of program choices.

It is a further object of the present invention to provide a highly intuitive user interface for a programming guide system to support a simple and convenient selection of desired programming information.

The attainment of the foregoing and related objects, advantages, and features of the present invention will be more readily apparent after review of the detailed description to follow and the appended drawings.

DETAILED DESCRIPTION

The present invention is directed to a system for retrieving and displaying programming information, thereby providing a user with a schedule or guide of available programs. Although the preferred embodiment of the present invention will be described with respect to interactive and broadcast television programming, those skilled in the art will recognize that the present invention can be used with other forms of programming information, including radio, broadcast print, audio, games, computer software, and other combinations of audio/video or software information. Accordingly, it will be understood that programming information generally includes information for programs transmitted electronically to entertain, instruct, or inform the recipient.

Figure 1:
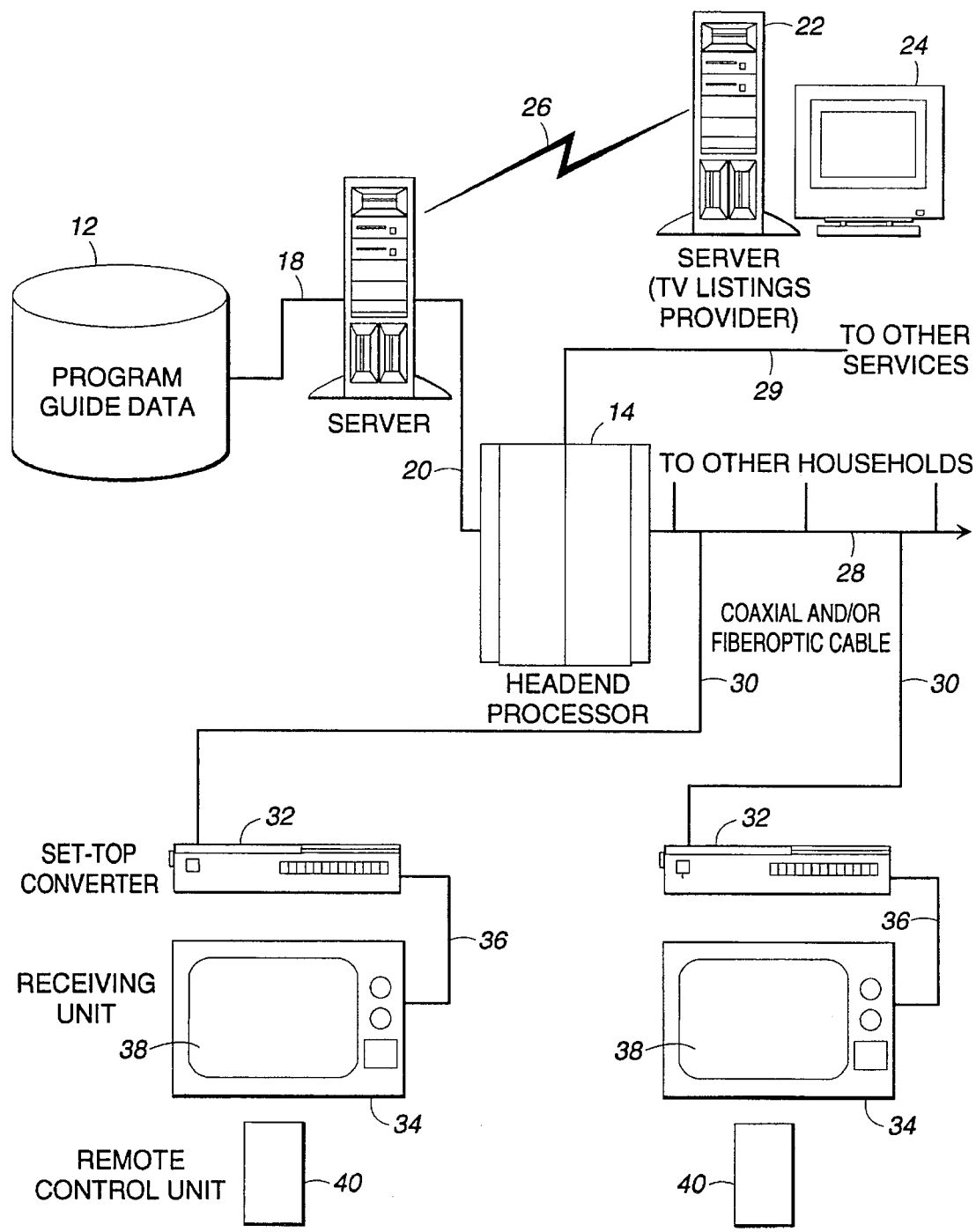
FIG. 1 is a block diagram of the operating environment for the preferred embodiment of the present invention.

Turning now to the drawings, in which like numerals indicate like elements throughout the several figures, FIG. 1 illustrates the operating environment for the program schedule system 10. A memory storage device 12, such as a hard disk drive or an optical storage system, stores programming information in a digital format. This programming information can be supplied for the benefit of one or more subscribers to communications services responsible for the origination or distribution of programs associated with this programming information. One or more databases for various classes of programming information are maintained on the memory storage device 12.

For programming information related to television programs, the preferred database structure includes at least four tables, namely (1) a table containing records for each television episode, (2) a table containing records for each television series, (3) a table containing records of program categories, and (4) a table containing records of program subcategories. Each television episode is linked to its parent television series and each television series is associated with categories and subcategories which define the characteristics of the series. These categories and subcategories are respectively represented by the program category table and the program subcategory table, which are linked to records for the television series table by another table, the junction table. The junction table allows a one-to-many relationship, thereby supporting the classification of television programs under more than one category or subcategory.

To support the distribution of the programming information to each of the subscribers, the memory storage device 12 is connected to a headend processor 14 via a server 16. A conductive path 18 supplies a two-way communications link between the memory storage device 12 and the server 16. Likewise, a conductive path 20 supplies a two-way communications link between the headend processor 14 and the server 16. For the preferred embodiment, the server 16, in combination with the conductive paths 18 and 20, form a local area network that enables the headend processor 14 to interact with any other device on this network, including the memory storage device 12. The server 16 can be implemented by a computer running administrative software that controls access to the devices connected to the network.

To support the tasks of updating or revising the program information stored on the memory storage device 12, a computer workstation 24 and a server 22 are connected to the server 16 via a communications link 26. This communications link allows a program distributor or supplier, which typically operates at a location remote from the databases stored within the memory storage device 12, to transmit programming information for storage by the memory storage device 12 and eventual distribution to subscribers via the headend processor 14. The communications link 26 can be implemented by either a wireless or wired communications system. For example, the communications link 26 can be constructed as a microwave link or as a conventional telephone link.

The headend processor 14 operates to control the distribution of programming information stored on the memory storage device 12 and the associated programs to one or more subscribers of associated programming services. The headend processor 14 is connected to each of the subscribers via a cable distribution network 28. The cable distribution network 28 is preferably implemented as an interactive communications network. This supports delivery of programming information and programs via the headend processor 14 to the subscriber and the delivery of requests for programming information and programs by the subscriber to the headend processor 14. The cable distribution network 28 can be implemented by a microwave distribution system, a telephone system, coaxial or optical cables, or any combination of these delivery systems. The headend processor 14 also can support the distribution of programs associated with the programming information to the subscribers and support other services via a separate distribution network 29.

Those persons skilled in the art will appreciate that the programs delivered over the cable distribution network 28 typically comprise both video and audio signals. Programs can be delivered in digital format, analog format, or a combination of both analog and digital formats. However, for the preferred embodiment, the programs are delivered as a stream of digital video and audio signals. Likewise, programming information supplied to subscribers and requests or instructions issued by subscribers are preferably digital format signals.

Each subscriber is connected to the cable distribution network 28 via a cable 30 supplied to a set-top converter 32. The cable 30 is preferably implemented as either a coaxial cable or a fiber optic cable. In this manner, the subscriber "taps" into the cable distribution network 28 to (1) receive programs and programming information distributed by the headend processor 14 and to (2) transmit requests or instructions to the headend processor 14.

The set-top converter 32 accepts the programs and the programming information from the cable 30 and converts these signals to a format compatible for presentation by a receiving device 34, such as a television or a computer system. The set-top converter 32 is connected to the receiving device 34 via a conductive path 36. The receiving device 34 preferably includes a display 38 for displaying both programs and programming information. In particular, the programming information is supplied to the subscriber as a program schedule or guide via the display 38.

Selected operating functions of the set-top converter 32 can be remotely controlled by a remote control unit 40. The subscriber can use the remote control unit 40 to select for viewing certain characteristics of alternative user interfaces supplied by the schedule display, as described in more detail below with respect to FIGS. 2–4 and 6–8. The preferred remote control unit 40 is more fully described with respect to FIG. 5.

Generally, the instructions transmitted by the remote control unit 40 are received by the set-top converter 32 and, in response, one or more of the characteristics of the program schedule can be controlled to display the desired programming information to the subscriber. In particular, the set-top converter 32 receives certain instructions from the remote control unit 40 and, in turn, forwards these instructions to the headend processor 14 via the cable 30 and the cable distribution network 28. The headend processor 14 responds by retrieving selected programming information from the memory storage device 12 and transmitting the selected programming information via the return path provided by the cable distribution network 28 and the cable 30. The set-top converter 32 then supplies this programming information to update the schedule display presented by the display 38.

Figure 2:
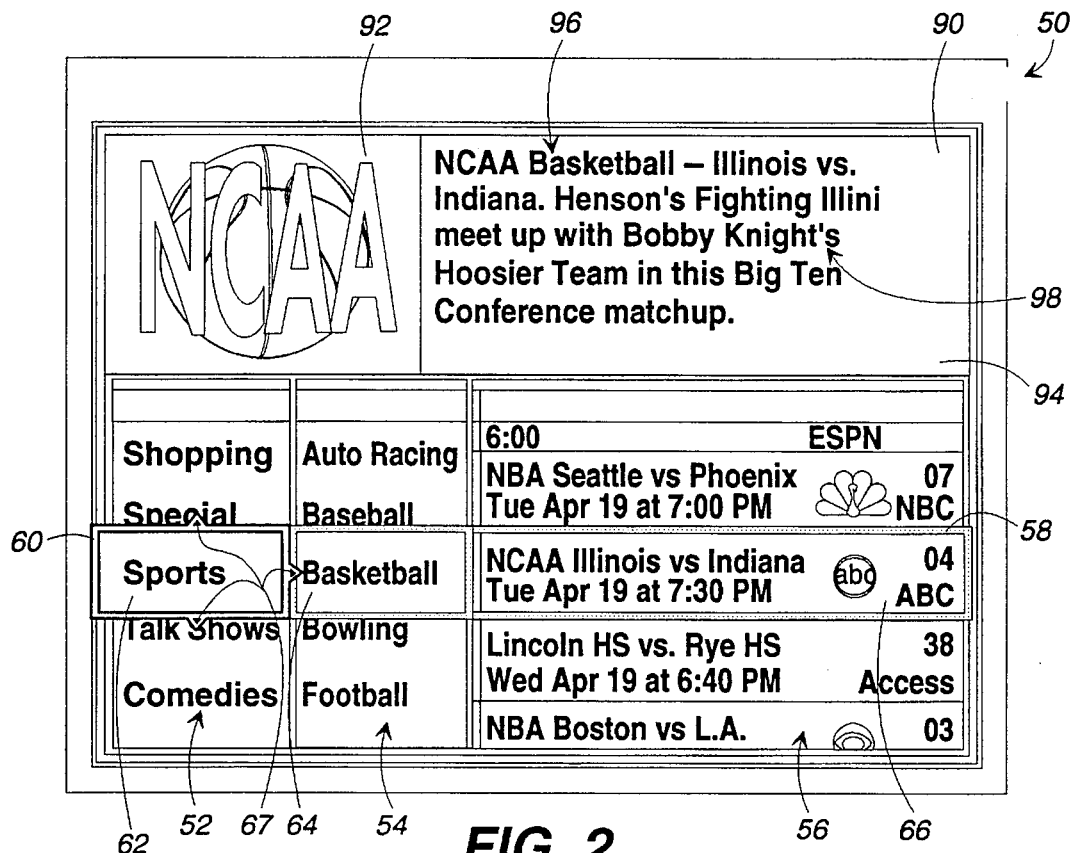
FIGS. 2, 3, and 4 are representations of a programming schedule incorporating the user interface for the preferred embodiment of the present invention.

FIG. 2 is a diagram illustrating the preferred presentation of programming information by a schedule display 50. Referring to FIG. 2, the schedule display 50 includes three display elements, a category display 52, a subcategory display 54, and a program display 56. Each of the displays 52, 54, and 56 display separate classes of programming information. Specifically, the category display 52 displays various categories of programming information, such as "Animated," "Children," "Game Show," and so forth. Likewise, the subcategory display displays subcategories of programming information that are associated with the categories offered by the category display 52. For example, subcategories for the "Animated" category can include "Adventure," "Children," or "Martial Arts." Thus, in comparison to the category display 52, the subcategory display 54 displays a more narrow scope of programming information.

The program display 56 displays program items that are associated with the subcategories offered by the subcategory display 54. Thus, the program display 56 supplies programming information that is narrower in scope than either the subcategories of the subcategory-display 54 or the categories of category display 52. For example, the program display 56 presents program-specific information, such as program title, program start-time, and program channel. Each of these program items represents an actual program that can be viewed by the subscriber at a certain date and time.

As shown in FIG. 2, the displays 52, 54, and 56 are located adjacent to each other and the subcategory display 54 is sandwiched between the category display 52 and the program display 56. A viewing panel 58 spans the width of the schedule display 50 by extending along a portion of each of the displays 52, 54, and 56. For the preferred embodiment, the viewing panel 58 is mounted in a fixed location on the central portion of the schedule display 50. In contrast, a focus frame 60, which moves along a horizontal track of the viewing panel 58, can be positioned proximate to any one of the displays 52, 54, and 56. The viewing panel 58 focuses the subscriber's attention on a selected category, subcategory, and program. In contrast, the focus frame 60 serves to focus the user's attention upon a particular class of selected programming information and operates as an indication that the subscriber can control the programming information supplied by an associated display.

Programming information is presented by each of the displays 52, 54, and 56 via tiles, wherein each tile represents a specific item of programming information. The category display 52 includes category tiles 62 representing categories; the subcategory display 54 includes subcategory tiles 64 representing subcategories; and the program display 56 includes program tiles 66 representing programs. The category tiles 62 and the subcategory tiles 64 are preferably arranged in alphabetical order for the represented categories and subcategories. In contrast, the program tiles 66 are preferably chronologically-ordered based upon both the dates and start times of the represented programs.

The visible portion for each of the displays 52, 54, and 56, i.e., the display panel, may reflect only a subset of the entire list of programming items represented by tiles. Accordingly, tiles which are not immediately visible to the subscriber can be accessed by scrolling the display in a selected vertical direction. By moving the tiles of the selected display in either an up or down direction, previously hidden tiles are revealed in one direction and previously visible tiles are obscured in the other direction. For example, the subcategory tiles 64 of the subcategory display 54 will wrap from beginning to end unless there are less than four items of programming information for the selected subcategory. Thus, each of the displays 52, 54, and 56 can be viewed as a vertically spinning dial of tiles that supply programming information.

Figure 3:
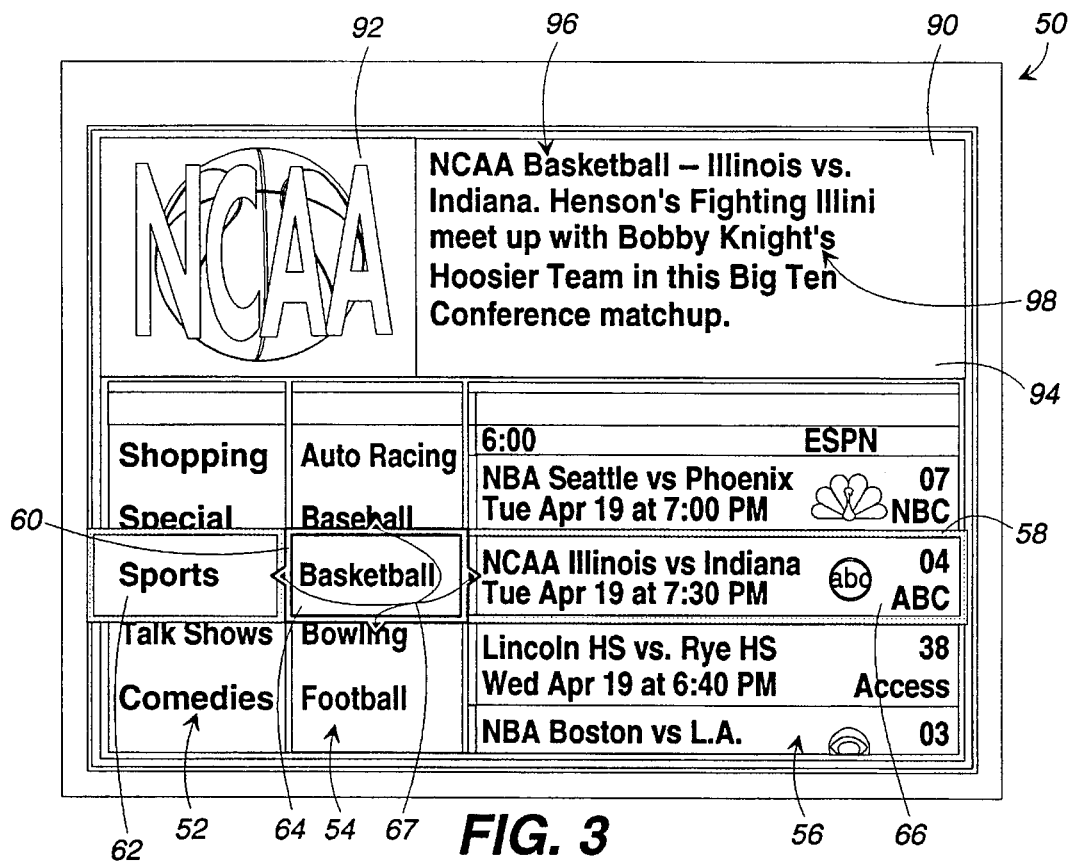
Figure 4:
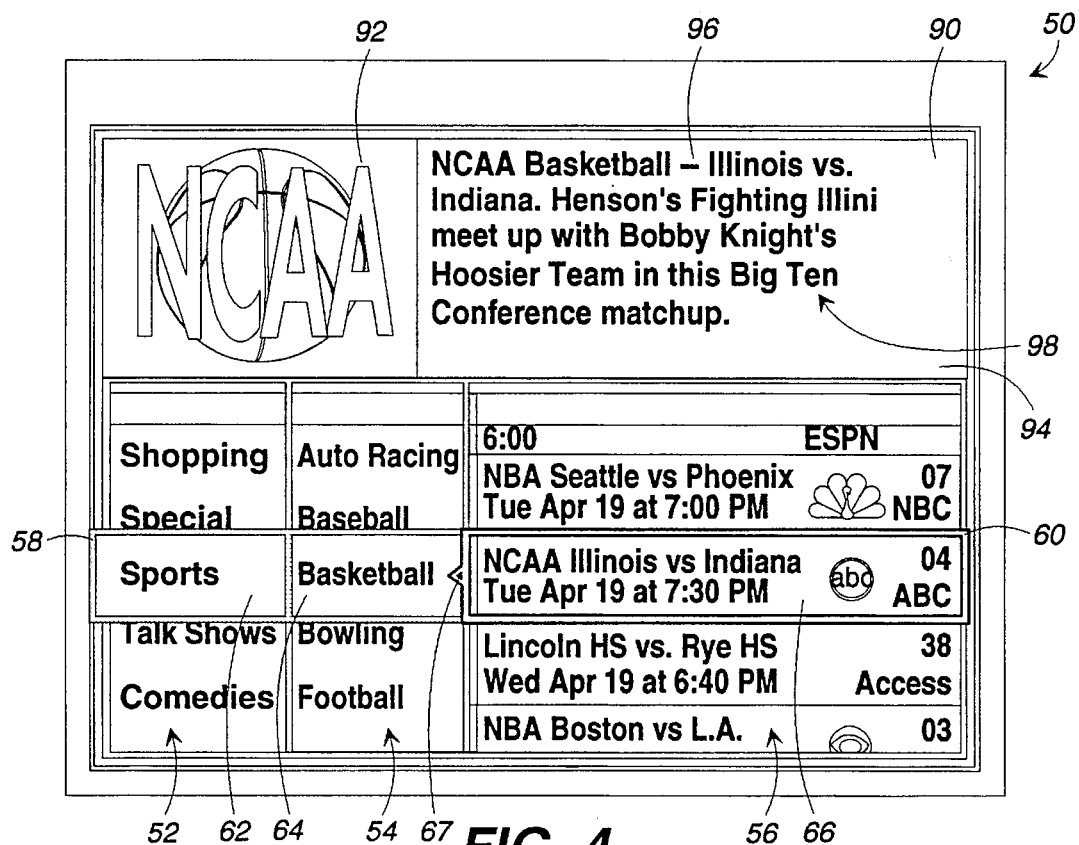

To "spin" one of the displays 52, 54, or 56, the focus frame 60 is moved along the viewing panel 58 to one of the displays. When the focus frame 60 is located proximate to the selected display, the subscriber has the option of scrolling up or down to reveal additional tiles. For the schedule display 50 shown in FIG. 2, the focus frame 60 is located proximate to the category display 52, thereby allowing the subscriber to scroll the category tiles 62 representing categories of programming information. FIGS. 3 and 4 respectively show the focus frame 60 located proximate to the subcategory display 54 and the program display 56, thereby allowing the subscriber to control the items presented by these displays. For the preferred schedule display 50, each of the displays 52, 54, and 56 uses three-dimensional shading to indicate that a tile is scrolling off beyond the visible area of its display.

As shown in FIGS. 2–4, arrow tabs 67 can be appended to the sides of the focus frame 60 to supply the subscriber with an indication of (1) the direction(s) that the focus frame 60 can move along the viewing panel 58, and (2) the directions that the subscriber can scroll the tiles of the selected display. For the schedule display 50 illustrated in FIG. 2, an arrow tab 67 is appended to the right hand side of the focus frame 60 to supply the subscriber with an indication that the focus frame 60 can be moved to either the subcategory display 54 or the program display 56. For this position of the focus frame 60, arrow tabs 67 also can be appended to the top and bottom sides of the focus frame 60 to alert the subscriber that the category display 52 can be scrolled in the up direction or the down direction.

For the focus frame 60 located proximate to the subcategory display 54 in FIG. 3, an arrow tab 67 can be appended to each of the four sides of the focus frame 60, thereby advising the subscriber that the focus frame 60 can be moved in a horizontal direction to either the category display 52 or the program display 56, and that the subcategory display 54 can be scrolled in either the up direction or the down direction. Likewise, for the focus frame 60 located proximate to the program display 56 shown in FIG. 4, the focus frame 60 can include an arrow tab 67 located on the left hand side of the frame and arrow tabs 67 located on the top and bottom sides of the frame. The positioning of these arrow tabs 67 indicate that the subscriber can move the focus frame 60 along the viewing panel 58 to either the subcategory display 54 or the category display 52, or scroll the program tiles in a selected vertical direction.

Figure 5:
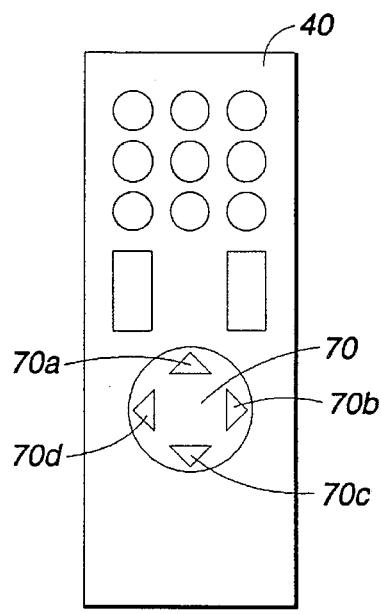
FIG. 5 is an illustration of the face of a remote control unit that supports the user's control of programming information displayed by the preferred embodiment of the present invention.

FIG. 5 is an illustration of the face of a remote control unit for controlling selected features of the schedule display. Referring now to FIGS. 1, 2 and 5, the remote control unit 40 can transmit instructions to the set-top converter 32 to allow the subscriber to (1) move the focus frame 60 to one of the displays 52, 54, or 56, and (2) scroll the tiles of the selected display. The face of the remote control unit 40 includes a control button 70 having navigation keys 70a–d for inputting commands to control features of the schedule display 50. This control button 70 is preferably implemented as a rocker-type switch which can operated in four distinct positions represented by the navigation keys 70a–d. Navigation keys 70b and 70d control the position of the focus frame 60 along the viewing panel 58 and navigation keys 70a and 70c control the scrolling operations of the displays 52, 54, and 56. Specifically, by pressing the navigation key 70b, the remote control unit 40 transmits a command to move the focus frame 60 to the right. In similar fashion, user selection of the navigation key 70d initiates a transmission of a command to move the focus frame 60 to the left. Navigation key 70a allows the subscriber to move the tiles of the selected display in an up direction, whereas navigation key 70c moves the tiles of the selected display in a down direction. The navigation keys 70a–d are preferably shaped in the form of an arrow to define the directional control functions associated with these command keys. The remote control unit 40 can include additional keys or buttons for inputting commands to control other operations of the set-top converter 32 or the receiving device 34.

In response to a command input by one of the navigation keys 70a–d, the remote control unit 40 transmits an instruction to the set-top converter 32 via an infrared communications link. In turn, the set-top converter 32 decodes the instruction and responds by controlling the selected feature of the schedule display 50. Specifically, the set-top converter 32, which converts the programs' and programming information delivered by the cable distribution network 28 for presentation via the display 38, can control each of the displays 52, 54, and 56 and the position of the focus frame 60 on the viewing panel 58. In addition, the set-top converter 32 can update the programming information presented by the schedule display 50 by outputting a request to the headend processor 14 via the return path supplied by the cable distribution network 28. This allows the retrieval of desired programming information from the memory storage device 12 containing the database which maintains program guide data.

Returning now to FIGS. 1–4, the subscriber typically selects programming information by first choosing the general category for the desired programming information. By moving the focus frame 60 to the category display 52, the subscriber can select a category of programming information by scrolling the category display 52 until the category tile 62 representing the desired category appears within the viewing panel 58. By scrolling the category tiles 62 in a selected vertical direction, each category tile sequentially appears within the viewing panel 58. A category is selected when its corresponding category tile 62 appears within the frame of the viewing panel 58. In turn, this "resets" the subcategory display 54 to display subcategory tiles 64 representing subcategories associated with the selected category. The program display 56 responds to the appearance of a selected subcategory tile 64 within the viewing panel 58 by displaying one or more program tiles 66 representing programs associated with the selected subcategory if such programs are available for the selected subcategory. Thus, the viewing panel 58 can display tiles representing the selected category, subcategory, and program.

In response to the selection of a new category of programming information, the set-top converter 32 outputs a request to the headend processor 14 for programming information representing subcategories associated with the selected category. The subcategory display 54 is reset by the setup converter 32 in response to receiving the requested subcategory items over the cable distribution network 28. Likewise, in response to the selection of a subcategory item, the set-top converter 32 outputs a request for programming information representing programs associated with the selected subcategory. If a program is available which corresponds to the selected subcategory and category, then the set-top converter 32 updates the program display 56 in response to receiving each program item via the cable distribution network 28. This allows the programming information to be maintained at a central location, namely, the site of the memory storage device 12, rather than in a memory device located within each set-top converter 32 at a subscriber's premises.

For a particular set of selected programming information, the viewing panel 58 preferably displays a single tile for each of the selected category display 52, subcategory display 54, and program display 56. For example, the selected category for the schedule display 50 in FIGS. 2–4 is represented by the category tile 62 containing the text "Sports". Likewise, the selected subcategory is represented by the subcategory tile 64 containing the text "Basketball" and the selected program is represented by the program tile 66 containing the text "NCAA Illinois vs. Indiana". For this illustrated example, the user first selected the category of "Sports" and subsequently selected the associated subcategory of "Basketball" to obtain a listing of information for scheduled or available basketball-related programs. In view of the foregoing, it will be understood that the viewing panel supplies the user with a convenient viewing window for information items about an available program that is associated with the selected subcategory and category.

For the preferred embodiment of the schedule display 50, neither the subcategory display 54 nor the program display 56 will change to reflect the selection of a new category until a short default time-out period has expired. This prevents rapid and unnecessary updating of these displays while the subscriber is navigating within the category display 52. Accordingly, when a new category is selected by scrolling the corresponding category tile 62 within the viewing panel 58, the "old" items displayed by the panels of the subcategory display 54 and program display 56 fade out and "new" items corresponding to the selected category fade in.

If a subcategory is selected and program-related information is not available, then the program display 56 becomes blank by failing to display any of the program tiles 66. In addition, the right-hand side arrow tab 67 appended to the focus frame 60, which is located proximate to the subcategory display 54, is no longer shown to the user. Alternatively, the category display 52 and the subcategory display 54 can be restricted to respectively display tiles 62 and 64 for classes of programming information which represent available programs. These operations supply visual cues to the user that program-related information is not available for the selected subcategory that is represented by the subcategory tile 64 within the viewing panel 58.

The preferred viewing panel 58 emphasizes the selection of the displayed items by highlighting the associated tiles within the frame of the viewing panel. This highlighting can be achieved by coloring or shading the tiles appearing within the viewing panel 58 in a color that is lighter than the remaining tiles displayed in the display panel for each of the displays 52, 54, and 56. In addition, because the displays 52, 54, and 56 are located adjacent to each other, the selected category, subcategory, and program tiles 62, 64, and 66 are aligned within the viewing panel 58. This presentation of the programming information allows the subscriber to easily read the various classes of desired information by beginning with a broad genre on one side of the schedule display 50 and concluding with an individual program matching that genre on the other side of the schedule display 50.

Table I supplies a representative list of categories and associated subcategories for the preferred system. The category tiles 62 and the subcategory tiles 64 respectively represent the items shown in the listings of Table I.

TABLE I

| CATEGORY | SUBCATEGORIES |
|---|---|
| Animated | All |
| | Adventure |
| | Children |
| | Martial Arts |
| Awards | All |
| Children | All |
| | Science Fiction |
| | Action |
| | Adventure |
| | Animated |
| | Animals |
| | Anthology |
| | Comedy |
| | Drama |
| | Educational |
| | Exercise |
| | Fantasy |
| | Fiction |
| | Game Show |
| | Magazine |
| | Nature |
| | News |
| | Religious |
| | Science |
| | Spanish |
| | Sports |
| | Suspense |
| | Variety |
| Game Show | All |
| | Animals |
| | Educational |
| | Children |
| | Variety |
| Holiday | All |
| Magazine | All |
| | Auto |
| | Biography |
| | Educational |
| | Exercise |
| | Health |
| | How To |
| | Interview |
| | Children |
| | Medical |
| | Nature |
| | News |
| | Public Affairs |
| | Travel |
| Medical | All |
| | Health |
| Music | All |
| | Comedy |
| | Dance |
| | Drama |
| | Religious |
| | Travel |
| | Variety |
| Music | All |
| | Dance |
| | Religious |

TABLE I-continued

| CATEGORY | SUBCATEGORIES |
|---|---|
| Musical | All |
| Soap Opera | All |
| | Comedy |
| | Drama |
| | Spanish |
| Sports Events | All |
| | Event |
| | Anthology |
| | Baseball |
| | Boxing |
| | Basketball |
| | Bowling |
| | Golf |
| | Hockey |
| | Horse |
| | Racing |
| | Rodeo |
| | Rugby |
| | Soccer |
| | Track and Field |
| | Tennis |
| | Volleyball |
| | Wrestling |
| | Water |
| Sports Non-Event | All |
| | Action |
| | Adventure |
| | Auto |
| | Baseball |
| | Bicycle |
| | Biography |
| | Boat |
| | Body building |
| | Boxing |
| | Basketball |
| | Exercise |
| | Football |
| | Fishing |
| | Game Show |
| | Golf |
| | Hockey |
| | Horse |
| | How To |
| | Interview |
| | Magazine |
| | Martial Arts |
| | News |
| | Outdoors |
| | Racing |
| | Rodeo |
| | Rugby |
| | Running |
| | Softball |
| | Skiing |
| | Soccer |
| | Spanish |
| | Tennis |
| Sports Talk | All |
| | Baseball |
| | Basketball |
| | Interview |
| Talk | All |
| | Business |
| | Comedy |
| | Educational |
| | Fashion |
| | House and Garden |
| | Health |
| | Interview |
| | Magazine |
| | Medical |
| | Nature |
| | News |
| | Public Affairs |
| | Religious |
| | Science |

TABLE I-continued

| CATEGORY | SUBCATEGORIES |
|---|---|
| | Self-Help |
| | Shopping |
| | Spanish |
| | Travel |
| | Variety |

Referring to Table I, each subcategory having more than one item can include the special subcategory "All." The subcategory "All" encompasses all programming matching the associated category. This is preferably the default subcategory when the subscriber changes categories by selecting another category tile 62, which, in turn, resets the subcategory display 54. The remaining items within the listing of subcategories are directly linked to their respective category. For example, the subcategories "Business," "Comedy," and "Educational" are associated with the broad category of "Talk."

It will be appreciated that the present invention is not limited to the categories and subcategories listed in Table I, which is a listing of representative categories and associated subcategories of programming information. Those skilled in the art will understand that programming information can be divided into numerous broad and narrow classes and that the above-described system for retrieving and displaying programming information can be extended to other class-based listings of programming information. Accordingly, the listing in Table I is not intended to be a comprehensive list of possible categories and related subcategories of programming information.

Referring again to FIGS. 1–4, the user can use the program display 56 to view program items for available programs which match the class items reflected in the display panels of the category display 52 and the subcategory display 54. The program tiles 66 of the program display 56 are preferably displayed in sequential fashion based on the date and start time of the represented programs. For the preferred embodiment of the schedule display 50, a program tile 66 representing programming information for a program available to the user on the present date is initially displayed within the viewing panel 58. However, if the subscriber scrolls through the program tiles 66, the subscriber can view in chronological order the various scheduled program items which match the selected category and subcategory. By convention, scrolling the program tiles 66 up allows a user to view program tiles 66, if any, representing programs available to the user at a time later then the program represented by program tile 66 currently appearing within the viewing panel 58. In contrast, scrolling the program tiles 66 down allows a user to view program tiles 66, if any, representing programs available to the user at a time prior to the program associated with the program tile 66 currently appearing within the viewing panel 58.

Each program tile 66 represents information about a selected program and can display the program title or name, the program date and start-time, and the channel number. Each program tile 66 also can include the network name and the network symbol, which is typically implemented as an icon graphically representing the logo of the corresponding channel or network. For example, the program tile 66 appearing within the viewing panel 58 in FIGS. 2–4 shows the program title "NCAA Illinois vs. Indiana," the name and symbol for the network "ABC", the channel number "04", and the date and start time "Tue Apr 19 at 7:30 PM." For the television application described herein, it will be appreciated that the programming information displayed by the program schedule generally corresponds to programs that are scheduled for the viewing benefit of the user.

For the preferred program display 56, the program tiles 66 are sorted in chronological order and date and start time information are supplied by each program tile 66.

The schedule display 50 also can include a program summary panel 90 to communicate detailed information about a selected program tile appearing within the viewing panel 58. For the preferred embodiment, the program summary panel 90 is located near the top of the schedule display 50 and stretches horizontally along the top portion of each of the displays 52, 54, and 56, thereby taking up approximately ⅓ of the schedule display 50. The size of the program summary panel 90 is approximately 552×144 pixels. For the preferred schedule display 50, the program summary panel 90 is always available for viewing by the user, regardless of the type or class of programming information selected by the user.

The information in the program summary panel 90 is preferably updated as the subscriber changes the settings of the schedule display 50, i.e., changing a selected tile appearing within the viewing panel 58 by scrolling one of the category display 52, subcategory display 54, or program display 56. This information update occurs in response to a "new" tile appearing within the viewing panel 58 and the expiration of a default time-out period. The default time-out period prevents rapid and unnecessary updating of the program summary panel 90 while the subscriber is scrolling the tiles of one of the displays 52, 54, or 56.

The preferred program summary panel 90 includes a preview section 92 and a text description section 94. The preview section 92, which has a size of 192×144 pixels, can show actual broadcast video data for a current program, or preview media information, including an "on-demand" attract clip or a still graphic image, such as a program title screen or a representative scene of a selected program. In addition, synchronized audio can be played to supplement the still graphic image or video data presented by the preview section 92. This allows a continuation of the broadcast audio when the subscriber switches from a program channel that delivers a program to the schedule display 50 that presents scheduling information about available programs.

More specifically, for current programs, the preview section 92 provides an opportunity for the subscriber to easily identify and evaluate a selected program. For past and future programs, the preview section 92 can display on-demand attract clips, which may be a more effective mechanism for attracting viewers than text-only descriptions of the programming. In addition, still graphic images can be used if an actual broadcast video signal for a current program or an on-demand attract clip is not available.

The preview section 92 can display an actual broadcast video signal if the current time is consistent with the time slot for the program represented by the selected program tile 66 appearing within the viewing panel 58. This video display is sized to match the size of the preview section 92. The actual broadcast video signal is supplied by a tuner, such as the tuner for the set-top converter 32 or the receiving device 34, and is scaled to fit within the window display of the preview section 92. The program represented by the selected program tile 66 defines the absolute MSO channel and, in turn, this absolute MSO channel designates the tuning frequency for the tuner.

If the current time is not consistent with the time slot for the selected program tile 66, then the preview window of the preview section 92 displays an on-demand attract clip or video preview, if one is available, scaled to fit within the preview window. The video data for the on-demand attract clip data is preferably stored within a Tiger video file, which is queued at the beginning of the file and played through to the end of the file. The Tiger video file for the appropriate on-demand attract clip is retrieved in response to a pointer supplied by the selected program tile. Each Tiger video file is preferably stored at the location of the headend processor 14 and distributed in response to a request output by the subscriber's set-top converter 32.

If neither a current program broadcast video signal nor an on-demand attract clip is available for the selected program tile 66, a still graphic image can be scaled and displayed within the preview window of the preview section 92. Each graphic image is preferably stored at the location of the headend processor 14 within a bitmap file that is linked to associated programming information maintained within the memory storage device 12. In addition, audio voice-over or background music stored within a .WAV file may be linked to this programming information. Alternatively, the audio voice-over or the background music can be supplied by a Tiger audio stream associated with the programming information. In either case, the selected program tile 66 appearing within the viewing panel 58 has a pointer that points to the corresponding still graphic image, thereby linking the programming information to the appropriate graphic image.

For the preferred schedule display 50, a transition between preview information supplied by the preview section 92 is indicated by either a fade to a selected color, such as dark gray, and a subsequent fade to the preview image, or a direct fade to the preview image.

The text description section 94, which has a size of 360×144 pixels, presents detailed information about a selected program represented by the program tile 66 appearing within the viewing panel 58. This text and/or graphic-based information typically cannot be presented within the smaller frame of a program tile 66 because of the requirement of displaying more than one program tile within the limited available screen dimensions for a conventional display 38. The text description section 94 can include a program title 96 defining the name of the program and a program description 98 generally describing the nature of the program. In particular, the program title 96 preferably displays the full name in bold typeface of the program associated with the selected program tile 66 appearing within the viewing panel 58. The program title 96 can be either a simple title naming the series or a compound title naming both a series and the title of a particular episode.

The program description 98 can display the full description of the selected program for the program tile 66 appearing within the viewing panel 58. This program description 98 is preferably implemented as a text-based field capable of displaying various text attributes, including italic, bold, underline, and different fonts and point sizes.

The text description section 94 also can include one or more information icons, which are graphical images representing particular types of information, such as star ratings, closed captioning, rerun, audience rating, etc. The bottom line of the text description section 94 is preferably used to display such information icons as required to present secondary information. Because some programs may be associated with a large set of information icons, the information icons are preferably ranked in order of priority to insure readability of the text description section 94. If display space is limited, this priority ranking scheme allows the most significant items of secondary information to be displayed within the text description section 94.

For the example offered by the schedule display 50 of FIGS. 2–4, the program title 96 is "NCAA Basketball—Illinois vs. Indiana." and the program description 98 is "Henson's Fighting Illini meet up with Bobby Knight's Hoosier Team in this Big Ten Conference Matchup."

For the preferred schedule display 50, a transition between preview information supplied by the text description section 94 is indicated by a fade to a selected color, such as light gray, and a subsequent fade to the text-based image.

For the representative example provided by the schedule display 50 of FIGS. 2–4, the preview section 92 shows a graphic image of a basketball and the logo "NCAA" centered on the basketball. This graphic image is consistent with the text presented within the text description section 94, specifically "NCAA Basketball—Illinois vs. Indiana. Henson's Fighting Illini meet up with Bobby Knight's Hoosier Team in this Big Ten Conference Matchup."

Figure 6:
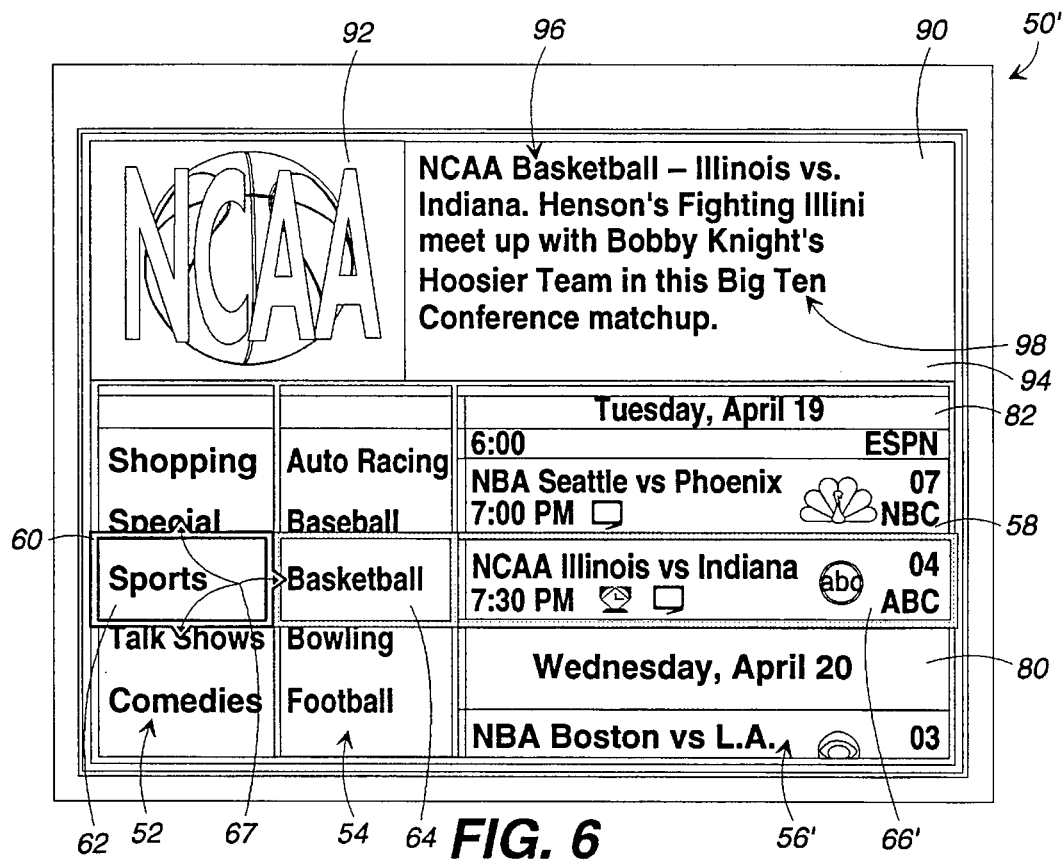
FIGS. 6, 7, and 8 are representations of an alternative programming schedule incorporating the user interface for another embodiment of the present invention.
Figure 7:
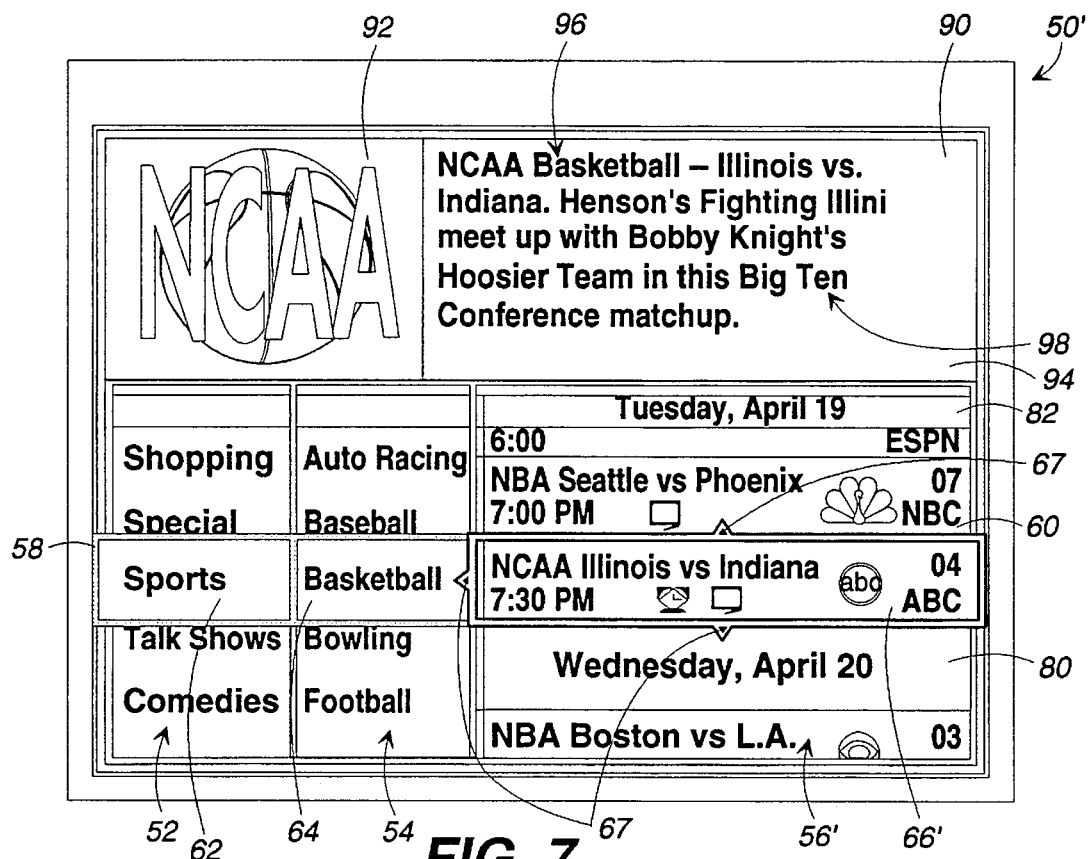
Figure 8:
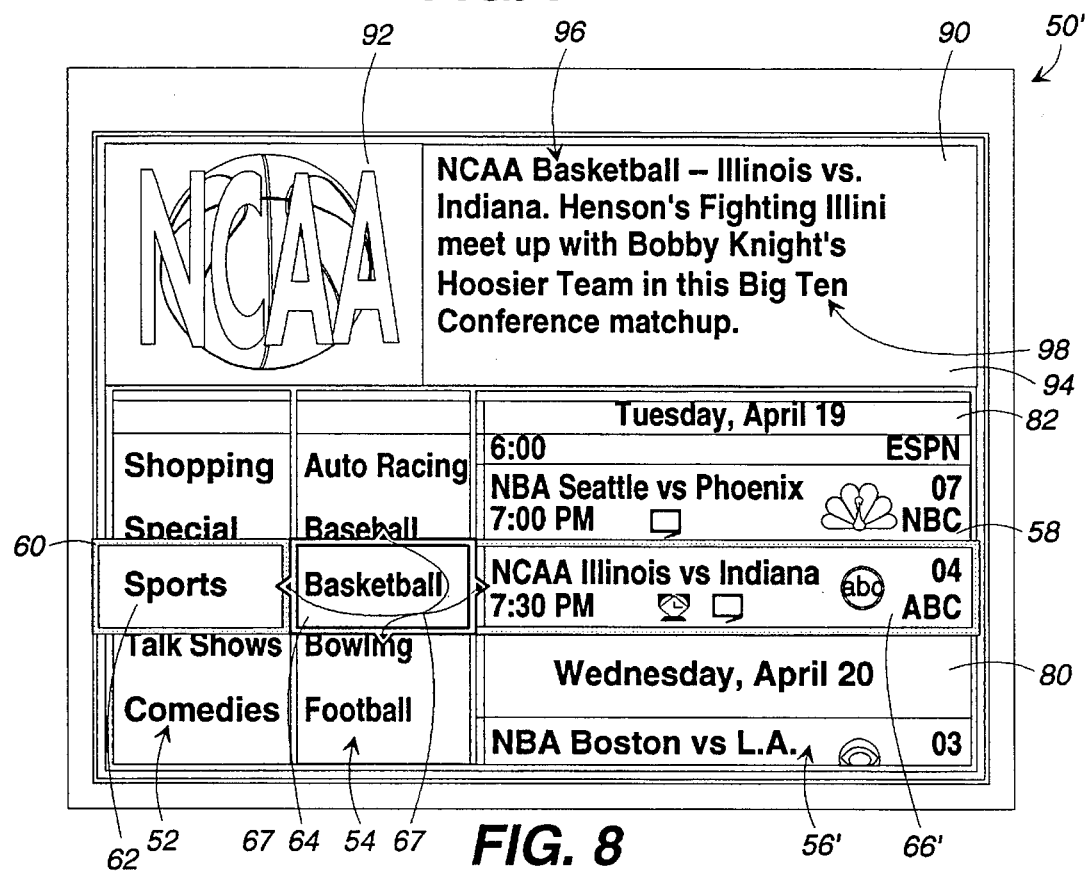

FIGS. 6–8 illustrate another embodiment for the presentation of programming information, the schedule display 50', which includes a modified version of a program display for displaying program-related information. FIG. 6 illustrates the focus frame 60 located proximate to the category display 52, FIG. 7 illustrates the focus frame 60 located proximate to the subcategory display 54, and FIG. 8 illustrates the focus frame 60 located proximate to the program display 56'. Focusing now upon the alternative schedule display 50' of FIGS. 6–8, it will be seen that date information for program is not presented by each of the program tiles 66' of the program display 56'. Instead, the program display 56' has been modified to include a date tile 80 containing date information to distinguish programs tiles 66' that are associated with a first date from program tiles 66' for a second date.

Data tiles 80 can be added to the program display 56' because the program tiles 66' for available programs are typically grouped in chronological order. Date tiles 80 are preferably the same size and shape as the program tiles 66", but contain only date-related information. For example, the format for a date tile 80 can be "Wednesday, Apr. 20" to define a date context for the displayed program tiles. Unlike the program tiles 66', date tiles cannot be selected by the subscriber and, accordingly, date tiles 80 do not appear within the viewing panel 58. For example, if the last program for a date is currently selected, and the subscriber scrolls the program tiles 66' forward through time, the first program of the next date will appear within the viewing panel 58 and the associated date tile 80 will appear as the first tile immediately above the viewing panel 58.

The program display 56' also includes a date status indicator 82 to provide additional date context for the program dates and times presented by the date tiles 80. If a date tile 80 is scrolled off the top of the program display 56', then the date status indicator 82 displays the date associated with that particular date tile. For example, the date status indicator 82 for the schedule display 50 of FIG. 6 shows the date information "Tuesday, Apr. 19" because the date tile 80 associated with that date has already scrolled off the top of the program display 56'. If the subscriber continues to scroll through the program tiles 66' shown in FIG. 6, then the date tile for "Wednesday, Apr. 20" will eventually scroll off the top of the program display 56', thereby resetting the date of the date status indicator 82 to that particular date.

Each program tile 66' represents information about a selected program and can display the program title or name, and the channel number. Each program tile 66' also can include the network name and the network symbol, which is typically implemented as an icon graphically representing the logo of the corresponding channel or network. If display space is available within the limited area of the program tile, then program information of secondary interest to the user can be presented as information icons on the program tiles 66'. Information icons, which are graphical images representing secondary information items, can be used to reduce the amount of text displayed by a program tile, thereby making it easier for the subscriber to locate and read the program titles. Information icons can represent a variety of secondary program-related information, including the items of closed captioning, audience rating, awards, star rating, or reruns status. It will be understood that the use of information icons is an option for the user interface supplied by the program schedule 50'.

Figure 9:
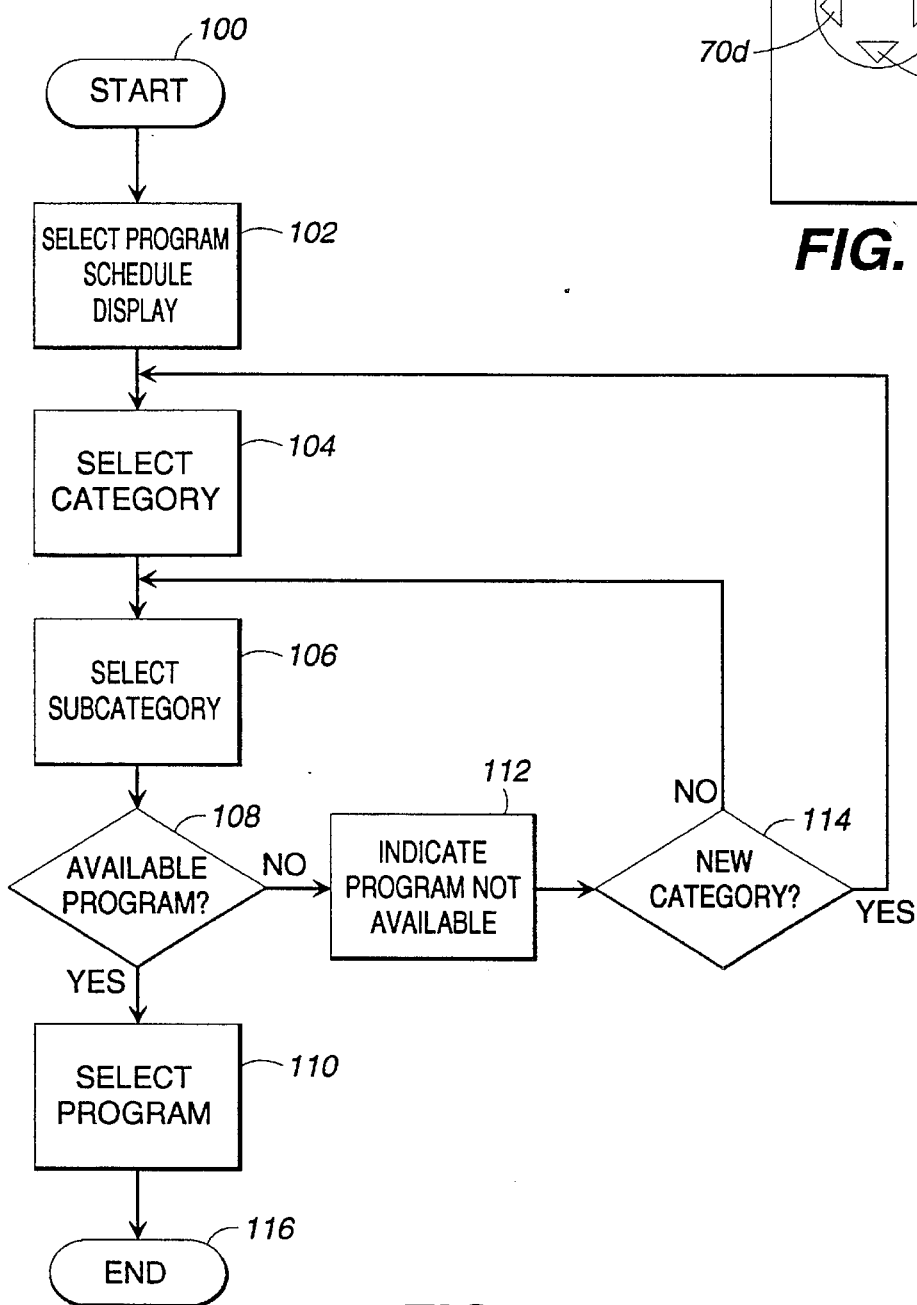
FIG. 9 is a logical flow diagram illustrating the steps of the preferred method for retrieving and displaying programming information.

FIG. 9 is a logical flow diagram illustrating the steps of the preferred method for retrieving and displaying programming information. Referring to FIGS. 1–4 and 9, the method starts at the START step 100 and proceeds to step 102 to select the presentation of the schedule display 50. The subscriber typically can select the display of the program schedule 50 by instructing the set-top converter 32 or the receiving device 34 to tune to a particular channel associated with the program guide system 10. By changing from an actual broadcast channel to the channel for the program guide system 10, the schedule display 50 can be presented by the display 38 for viewing by the subscriber.

In response to selecting the option of the schedule display 50, the subscriber can select the desired category of programming information by scrolling the category tiles 62 of the category display 52 until the category tile 62 representing the selected category appears within the viewing panel 58. This preferably resets the subcategory display 54 to display subcategory tiles 64 representing subcategory items associated with the selected category. In turn, the subscriber can select a desired subcategory item in step 106 by scrolling the subcategory tiles 64 of the subcategory display 54 until a subcategory tile 64 representing the selected subcategory appears within the viewing panel 58. In step 108, an inquiry is conducted to determine whether a program is available that corresponds to the selected subcategory. If the response is positive, then the "YES" branch is followed to step 110. In step 110, the program display 56 is preferably reset to display program tiles 66 representing available program items associated with the selected subcategory. This allows the subscriber to select programming information about a desired program by scrolling the program tiles 66 of the program display 56 until a program tile 66 representing the desired program appears within the viewing panel 58. In this manner, the subscriber views the selected category, subcategory, and program items within the viewing panel 58 to obtain the desired programming information.

If the response to the inquiry of step 108 is negative, then the "NO" branch is followed to step 112. In step 112, the schedule display 50 supplies an indication to the user that a program associated with the selected subcategory is not available. In response, the user can elect to select either a new category or subcategory to obtain a new class of programming information. If the user wishes to change the selected category, the "YES" branch is followed from step 114 to step 104. Otherwise, the user can change the selected subcategory and the "NO" branch is followed to step 106.

The process concludes at the END step 116.

Figure 10:
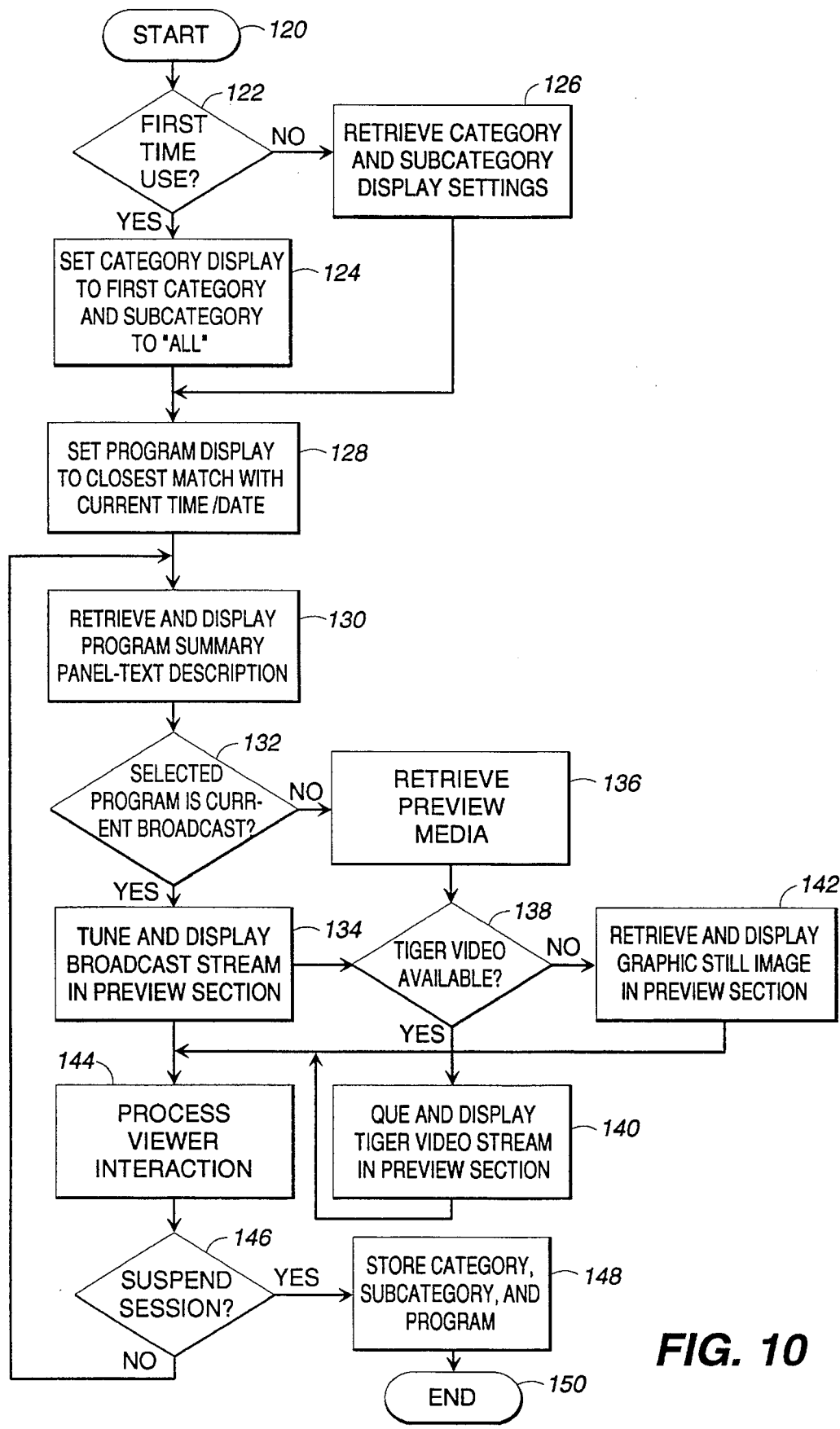
FIG. 10 is a logical flow diagram illustrating the steps of operation for a program schedule of the preferred embodiment of the present invention.

FIG. 10 is a flow chart diagram illustrating the steps of operation for the preferred program display supplied by the program schedule system 10. Referring now to FIGS. 1–4 and 10, operation of the program schedule system 10 starts at the START step 120 in response to the user's selection of the display of the program schedule 50. In step 122, an inquiry is conducted to determine whether the user has previously used the program schedule system 10 by viewing the schedule display 50. If the response is positive, then the "YES" branch is followed to step 124 and the category display 52 is set to display the category tile 62 representing the first possible category. For the preferred schedule display 50, the category tile 62 presented within the viewing panel 58 represents the category which appears first within the possible categories sorted in alphabetical order. In addition, the subcategory display 54 is preferably set to display the subcategory tile 64 representing the associated subcategory of "All." In contrast, if the response in step 122 is negative, then the "NO" branch is followed to step 126 and the settings for the category and subcategory displays 52 and 54 in the previous viewing session are selected.

From either step 124 or step 126, the process proceeds to step 128 to set the program display 56. Specifically, the program tile 66 representing the program associated with the selected category and subcategory and having the closest match with the current time and date is selected to appear within the viewing panel 58. In this manner, each of the displays 52, 54, and 56 is set and tiles representing category, subcategory, and program information appear within the viewing panel 58.

In step 130, programming information is retrieved and displayed within the text description section 94 of the program summary panel 90. This programming information can include both a text-based description of the program associated with the selected program tile 66 and information icons for this program.

In step 132, an inquiry is conducted to determine if the program represented by the selected program tile 66 is a current broadcast. If so, the "YES" branch is followed to step 134 and the set-top converter 32 is tuned to the appropriate program channel to display the broadcast stream within the preview section 92. In contrast, if the response to the inquiry in step 132 is negative, then the "NO" branch is followed to step 136. In step 136, preview media information, such as an on demand attract clip or a still graphic image, is retrieved from the location of the headend processor 14 based upon the particular program represented by the selected program tile 66. In step 138, a determination is made whether a Tiger video file is available for the selected program. If the response to the inquiry in step 138 is positive, the "YES" branch is followed to step 140. In step 140, the Tiger video file for the selected program is cued and the Tiger video stream is displayed within the preview section 92. Alternatively, if the response to this inquiry is negative, then the "NO" branch is followed from step 138 to step 142. In step 142, a digitized still graphic image for the selected program is retrieved and displayed within the preview section 92.

From step 140 or step 142, the process continues to step 144, in which the viewer can update the selected program displayed by the schedule display 50 based upon the viewer's interests, as described with respect to the process of FIG. 9.

In step 146, an inquiry is conducted to determine whether the display of the program schedule 50 should be discontinued. For example, the program schedule session can be discontinued by changing the channel of the set-top converter 32 to a channel other than the channel for the schedule display 50. If the response is positive, the "YES" branch is followed to step 148 and the selected category, subcategory, and program-related information are stored. Otherwise, the process continues by returning to step 130. The process concludes in step 150, the END step.

In summary, the present invention provides a programming guide system for retrieving and displaying programming information for a subscriber of programming services. The programming information is typically stored at a location which is remote from the subscriber's location and is distributed to the subscriber via a headend processor and a cable distribution network. Each subscriber can then receive the programming information via a set-top converter that is connected to a receiving device, such as a television or a monitor. The monitor supports the display of a schedule display that presents three classes of programming information, including categories, subcategories, and programs. The schedule display includes three displays, a category display, a subcategory display, and a program display. Each display can display an array of tiles representing corresponding programming information. A viewing panel extends along each of the displays for displaying one each of the category, subcategory, and program tiles. In response to a category tile representing a selected category appearing within the viewing panel, the subcategory display displays at least one subcategory tile representing a subcategory associated with the selected category. Likewise, in response to a subcategory tile representing a selected subcategory appearing within the viewing panel, the program display displays at least one program tile representing an available program associated with the selected subcategory. This allows the subscriber to view the selected programming information within the viewing panel of the schedule display.

From the foregoing, it will be appreciated that the present invention indeed fulfills the needs of the prior art described herein above and meets the above-stated objects and advantages. While there has been shown and described the preferred embodiment of the invention, it will be evident to those skilled in the art that various modifications and changes may be made thereto without departing from the spirit and the scope of the invention as set forth in the appended claims and equivalents thereof.

We claim:

1. A method for retrieving and displaying information, comprising the steps of:

providing a category display, a subcategory display and a program display, each of the displays respectively containing an array of category tiles, subcategory tiles, and program tiles, providing a viewing panel extending along at least a portion of the category display, the subcategory display, and the program display to display one each of the category tiles, subcategory tiles, and program tiles, providing a focus frame operative to supply an indication of user control of the display of the tiles when the focus frame is positioned along the respective display, selecting one of a plurality of categories represented by the category tiles by moving the focus frame along the viewing panel to the category display and scrolling the category tiles until a selected category tile appears within the viewing panel, selecting one of a plurality of subcategories represented by the subcategory tiles by moving the focus frame along the viewing panel to the subcategory display and scrolling the subcategory tiles until a selected subcategory tile appears within the viewing panel, and selecting one of a plurality of programs represented by the program tiles by moving the focus frame along the viewing panel to the program display and scrolling the program tiles until a selected program tile appears within the viewing panel.

2. The method recited in claim 1, wherein each of said subcategories is associated with said selected category, and each of said selected programs is associated with said selected subcategory.

3. The method recited in claim 1, wherein selecting one of said categories causes said subcategory display to show at least one of said subcategory tiles representing one of said subcategories associated with said selected category, and selecting one of said subcategories display causes said program display to show to at least one of said program tiles representing one of said programs associated with said selected subcategory.

4. The method recited in claim 3, wherein scrolling said program display moves chronologically through said program tiles representing programs that are associated with said selected subcategory.

5. The method recited in claim 1, wherein said array of category tiles and said array of subcategory tiles are maintained in alphabetical order for represented categories and subcategories.

6. The method recited in claim 1, wherein said array of program tiles is maintained in time-sorted order for represented programs.

7. The method recited in claim 1, wherein each of said program tiles comprises at least program name, program date and start time, and program channel.

8. The method recited in claim 1, wherein said program tiles are ordered in time-sorted order for represented programs, and said program display includes a plurality of date tiles representing dates, each of said date tiles separating said program tiles associated with one of said dates from said program tiles associated with another one of said dates.

9. The method of claim 8, wherein said program display further comprises a date status indicator operative to display one of said dates associated with one of said program tiles appearing within said viewing panel.

10. The method of claim 1, wherein said category display, said subcategory display, and said program display are operative to display at any particular interval up to a predetermined number of said category tiles, said subcategory tiles, and said program tiles.

11. A system for displaying information, comprising:

a category display for displaying an array of category tiles representing categories of said information;

a subcategory display for displaying an array of subcategory tiles representing subcategories, each of said subcategories associated with at least one of said categories, said subcategory display located adjacent to said category display;

a program display for displaying an array of program tiles, each of said programs associated with at least one of said subcategories, said program display located adjacent to said subcategory display;

a viewing panel extending along a portion of each of said category display, said subcategory display, and said program display for displaying one each of said category tiles, subcategory tiles, and program tiles; and a focus frame, movable along said viewing panel, responsive to placement proximate to one of said category display, said subcategory display, and said program display, to enable control of the display one of said category tiles, subcategory tiles, and program tiles, wherein said subcategory display, responsive to one of said category tiles representing a selected category appearing within said viewing panel, displays at least one of said subcategory tiles representing one of said subcategories associated with said selected category, and said program display, responsive to one of said subcategory tiles representing a selected subcategory appearing within said viewing panel, displays at least one of said program tiles representing an available one of said programs associated with said selected subcategory.

12. The system recited in claim 11, wherein said category tiles of said category display are scrollable in response to moving said focus frame proximate to said category display.

13. The system recited in claim 12, wherein said subcategory tiles of said subcategory display are scrollable in response to moving said focus frame proximate to said subcategory display.

14. The system recited in claim 13, wherein said program tiles of said program display are scrollable in response to moving said focus frame proximate to said category display.

15. The system recited in claim 14, wherein scrolling said program display moves chronologically through said program tiles representing programs that are associated with said selected subcategory.

16. The system recited in claim 11, wherein said array of category tiles and said array of subcategory tiles are maintained in alphabetical order for represented categories and subcategories.

17. The system recited in claim 11, wherein said array of program tiles is maintained in time-sorted order for represented programs.

18. The system recited in claim 11, wherein each of said program tiles comprises at least program name, program date and start time, and program channel.

19. The system recited in claim 11, wherein said program tiles are ordered in time-sorted order for represented programs, and said program display includes a plurality of date tiles representing dates, each of said date tiles separating said program tiles associated with one of said dates from said program tiles associated with another one of said dates.

20. The system of claim 19, wherein said program display further comprises a date status indicator operative to display one of said dates associated with said program tile appearing within said viewing panel.

21. The system of claim 11, wherein said category display, said subcategory display, and said program display are operative to respectively display up to a predetermined number of said category tiles, said subcategory tiles, and said program tiles.

22. The system of claim 11, wherein said category tiles are stored within a database and are retrievable to support the display of said category tiles by said category display.

23. The system of claim 22, wherein said subcategory tiles are stored within said database, and at least one of said subcategory tiles representing one of said subcategories associated with said selected category is retrieved from said database in response to one of said category tiles representing said selected category appearing within said viewing panel.

24. The system of claim 23, wherein said program tiles are stored within said database, and at least one of said program tiles representing one of said programs associated with said selected subcategory is retrieved from said database in response to one of said subcategory tiles representing said selected subcategory appearing within said viewing panel.

25. A method for selecting and displaying information, comprising the steps of:

selecting one of a plurality of categories of said information by moving a focus frame along said viewing panel to a category display displaying an array of category tiles representing said categories and scrolling in a selected vertical direction said category tiles until said category tile representing said selected category appears within said viewing panel, said focus frame operative to supply an indication of user control of the display of said category tiles when said focus frame is positioned proximate to said category display;

selecting one of a plurality of subcategories of said information, each of said subcategories being associated with said selected category, by scrolling a subcategory display displaying an array of subcategory tiles representing said subcategories until one of said subcategory tiles representing said selected subcategory appears within said viewing panel; and selecting one of a plurality of programs of said information, each of said programs being associated with said selected subcategory, by scrolling a program displaying an array of program tiles representing said programs until one of said program tiles representing said selected program appears within said viewing panel, wherein said viewing panel extends along at least a portion of said category display, subcategory display, and program display and supplies a highlighted display one each of said category tiles, said subcategory tiles, and said program tiles appearing within said viewing panel.

26. The method recited in claim 25, wherein said step of selecting one of said subcategories comprises:

moving said focus frame along said viewing panel to said subcategory display, said focus frame operative to supply an indication of user control of the display of said subcategory tiles when said focus frame is positioned proximate to said subcategory display;

scrolling in a selected vertical direction said subcategory tiles until said subcategory tile representing said selected subcategory appears within said viewing panel.

27. The method recited in claim 26, wherein said step of selecting one of said programs comprises:

moving a focus frame along said viewing panel to said program display, said focus frame operative to supply an indication of user control of the display of said program tiles when said focus frame is positioned proximate to said program display;

scrolling in a selected vertical direction said program tiles until said program tile representing said selected program appears within said viewing panel.

28. The method recited in claim 25, wherein said array of category tiles and said array of subcategory tiles are maintained in alphabetical order for represented categories and subcategories, and said array of program tiles is maintained in time-sorted order for represented programs.

29. The method recited in claim 25, wherein said program tiles are ordered in time-sorted order for represented programs, and said program display includes a plurality of date tiles representing dates, each of said date tiles separating said program tiles associated with one of said dates from said program tiles associated with a another one of said dates.

30. The method of claim 25, wherein said program display further comprises a date status indicator operative to display one of said dates associated with said program file appearing within said viewing panel.

* * * * *